United States Patent [19]

De Jesus et al.

[11] 3,727,529
[45] Apr. 17, 1973

[54] COMBINATION FLARE BAFFLE AND LIGHT SEAL FOR A REFLEX CAMERA

[75] Inventors: Charles De Jesus, Watertown; William P. Lane, Taunton; Richard R. Wareham, Marblehead, all of Mass.

[73] Assignee: Polaroid Corporation, Cambridge, Mass.

[22] Filed: June 7, 1971

[21] Appl. No.: 150,675

[52] U.S. Cl. ..................................................95/42
[51] Int. Cl. ..............................................G03b 19/12
[58] Field of Search.........................................95/42

[56] References Cited

UNITED STATES PATENTS

| | | |
|---|---|---|
| 3,601,027 | 8/1971 | Ono..........................................95/42 |
| 1,388,870 | 8/1921 | Lipp.....................................95/42 UX |
| 1,980,546 | 11/1934 | Petit et al.................................95/42 |
| 2,256,517 | 9/1941 | Cohen....................................95/42 X |
| 3,111,888 | 11/1963 | Ohashi et al.........................95/42 X |
| 3,479,946 | 11/1969 | Bohm....................................95/42 X |

Primary Examiner—Samuel S. Matthews
Assistant Examiner—Edna M. Bero
Attorney—Brown & Mikulka, Michael Bard and Frederick H. Brustman

[57] ABSTRACT

A movable baffle inside a relfex camera protects a film unit therein from stray light during a photographic exposure and helps prevent fogging of film units stored within the camera during focusing or storage by forming a labyrinth seal with a capping plate. The capping plate is movable so as to cover the film unit during focusing and storage, and includes guide means on its underside to control the movement of the baffle to its labyrinth seal position. The invention is especially suited for use in a folding single lens reflex camera.

19 Claims, 4 Drawing Figures

Patented April 17, 1973

INVENTORS
CHARLES DEJESUS
WILLIAM P. LANE
RICHARD R. WAREHAM
BY Brown and Mikulka
and
Frederick H. Brustman
ATTORNEYS Patented April 17, 1973

INVENTORS
CHARLES DEJESUS
WILLIAM P. LANE
RICHARD R. WAREHAM
BY Brown and Mikulka
and
Frederick H. Brustman
ATTORNEYS 3,727,529

COMBINATION FLARE BAFFLE AND LIGHT SEAL FOR A REFLEX CAMERA

BACKGROUND OF THE INVENTION

The present invention is especially useful in a folding reflex camera such as the one described in U.S. Pat. application Ser. No. 28,567, filed Apr. 15, 1970, in the name of Edwin H. Land. When such a reflex camera is either in a folded condition for storage or in an erected condition for focusing and framing, light must be prevented from reaching, and thereby fogging, the uppermost film unit in a cassette held within the reflex camera. It is especially important to provide an effective light seal during focusing because the novel configuration of the reflex camera described in said application, Ser. No. 28,567 allows light into the reflex camera, through the objective lens, forming an image proximate to the film unit itself.

During a photographic exposure when the film unit is intentionally uncovered, only light from the intended field of the reflex camera, following the designed optical path, should reach the film unit. Light entering the reflex camera through the objective lens from the points outside the field must not be allowed to impinge on the film unit being exposed lest it ruin a photograph and waste the film unit.

SUMMARY OF THE INVENTION

The present invention provides a means for protecting a film unit stored within a reflex camera from fogging and from exposure to extraneous light rays.

In one embodiment, a baffle plate (which prevents extraneous light rays from points outside the designed field of view of the camera, alternately referred to as flare, from reaching the film unit without passing along the intended optical path) is urged by a capping plate (which covers the film unit during focusing and storage) into a folded position. In such a folded position, the baffle forms a portion a labyrinth seal protecting the film unit from fogging by light allowed to enter the reflex camera for focusing purposes.

Accordingly, it is an object of the present invention to provide a light baffle which protects a film unit from extraneous light during exposure and also protects the film unit from fogging during focusing and storage.

Another object of the present invention is to provide a movable plate which functions as part of a labyrinth seal, and which, during a photographic exposure, also protects the film unit from exposure except by the image formed by the objective lens.

DESCRIPTION OF THE DRAWINGS

Other objects and many of the attendant advantages of the present invention will be better appreciated and said invention will become clearly understood by reference to the following detailed description when considered in conjunction with the accompanying drawings illustrating one embodiment of the instant invention, wherein:

FIG. 4 illustrates one configuration for the baffle used in the present invention.

DESCRIPTION OF THE PREFERRED EMBODIMENT

Figure 1:
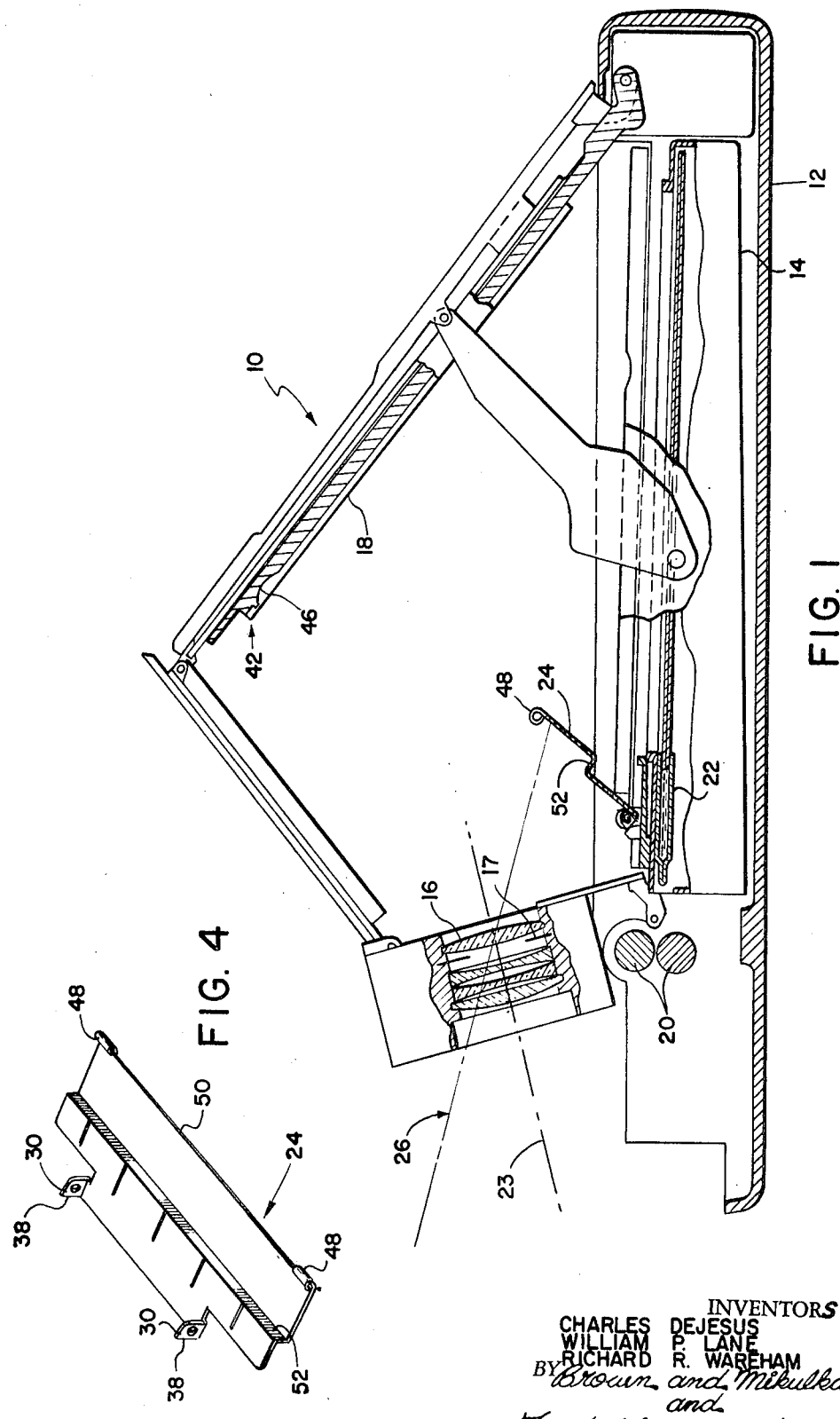
FIG. 1 illustrates a cross-section of a reflex camera with a light baffle positioned to protect a film unit from flare when the shutter opens.

A folding reflex camera 10 of the kind in which the present invention is most useful is shown in FIG. 1. The principal elements are a base 12 adapted for receiving a film cassette 14, an objective lens 16 with an axis 23, a shutter 17, and a reflex mirror 18. A pair of processing rolls 20 are positioned to receive an exposed self-developing film unit 22 emerging from the cassette 14 and process such film unit 22 in a well-known manner.

The objective lens 16 refracts light emanating from a subject (not shown) to form an image of the subject. The reflex mirror 18 reflects the image through an opening in the cassette 14 to the photosensitive surface of the uppermost film unit 22 which is coplanar with the focal plane of the reflex camera 10. The reflex mirror 18 permits the construction of a compact camera by folding the optical path and also makes it possible to obtain a properly oriented positive print. However, the position of the film unit 22, with respect to the axis 23 of the objective lens 16, makes it possible for light from sources outside the field of view of the camera 10 to impinge directly upon the photosensitive surface of the film unit 22. Such extraneous light must be prevented from reaching the film unit 22 because it causes flare and other distracting effects in a phototographic image.

A baffle 24 located within the camera 10 and between the objective lens 16 and the film unit 22, but outside of the optical path of the objective lens 16, blocks extraneous light such as exemplified by a ray 26. The baffle 24 thereby prevents fogging and the forming of irrelevant patterns on the film unit 22. By properly shaping and positioning the baffle 24, it performs its function without interfering with the normal image-forming function of the camera 10.

Figure 2:
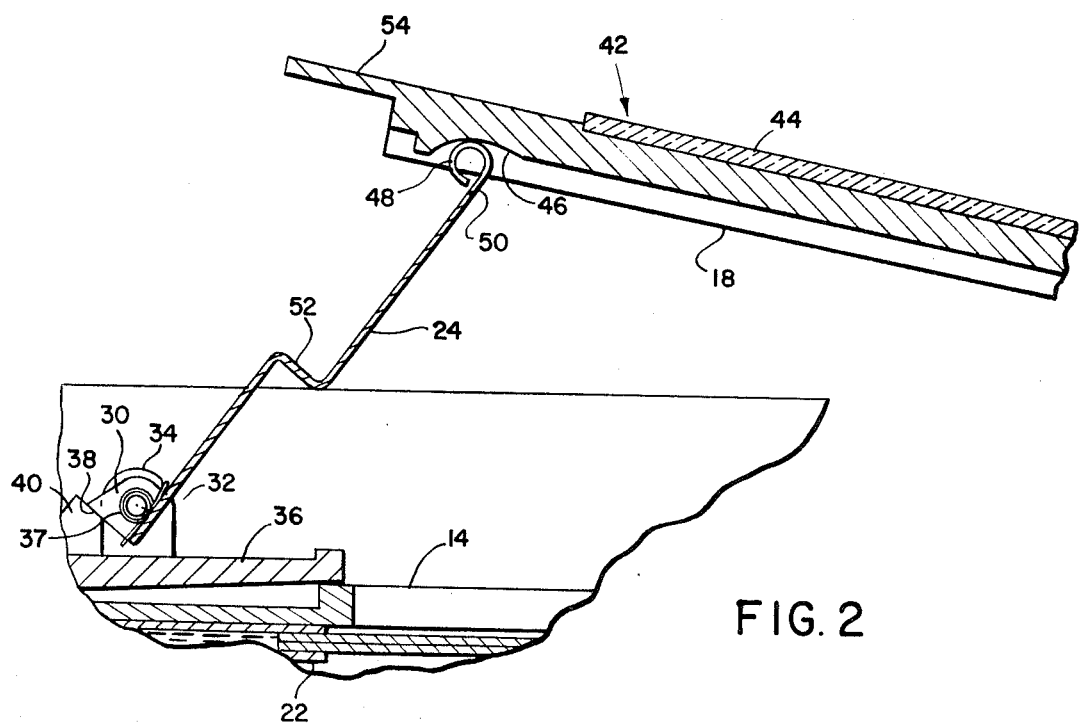
FIG. 2 illustrates a cross-section of a portion of the reflex camera of FIG. 1 with the baffle engaged by a capping plate.

Certain details of the baffle 24 and its mounting will be made clear by reference to FIG. 2. The baffle 24 is formed with a pair of tabs 30 having holes therein for an axle 32 which rotatably supports the baffle 24 between a pair of aligned, spaced posts 34 (only one post 34 is shown) mounted on a section 36 of the camera body 12. The section 36 extends to a position adjacent an opening in the cassette 14. A helical spring 37 coiled around the axle 32 urges the baffle 24 to rotate counterclockwise, that is, upwards. The tabs 30 each have an edge 38 which butts against one of a pair of stops 40 to maintain the baffle 24 in the proper position to prevent light entering through the objective lens 16 from directly reaching the film unit 22. The baffle 24 is preferably made with a light-absorbing surface finish such as flat black paint, at least on the surface toward the lens 16.

The baffle 24 is required to be in its upward position only when the film unit 22 is uncovered for making an exposure and the shutter 17 is open. When the components of the camera 10 are arranged for focusing and viewing, preparatory to taking a photograph, the film unit 22 must be protected from all exposure to light. A preferred method for protecting the film unit 22 is to cover it with a capping plate 42 pivotally attached to the rear of the camera case 12 in a manner more fully described in copending U. S. Pat. application, Ser. No. 88,847, filed Nov. 12, 1970, by Edwin H. Land, and assigned to Polaroid Corporation.

The capping plate 42 carries on its underside the reflex mirror 18 and on its upperside a focusing screen 44. To protect the film unit 22 from exposure to light, the capping plate 42 rotates counterclockwise (downward) to cover the opening in the cassette 14 through which the film unit 22 is exposed. The reflex mirror 18 functions at a point in the optical path intermediate the objective lens 16 and the film unit 22. Consequently, it can be smaller than the picture format of the film unit 22 and narrower than the capping plate 42 which must cover the film unit 22 to protect it from light.

The capping plate 42, when used in conjunction with the instant invention, has at least one guide surface 46 positioned thereon to engage one of a pair of lobes 48 on the baffle 24. As the capping plate 42 moves downward, the guide surface 46, bearing on the lobe 48, urges the baffle 24 to rotate clockwise (downward). Continued downward movement of the capping plate 42 forces the baffle 24 into a position between the capping plate 42 and the opening at the end of the cassette 14 closest to the objective lens 16.

To protect the reflex mirror 18 from scratches the baffle 24 might otherwise inflict on it, the two lobes 48 of the baffle 24 are separated by a distance greater than the width of the reflex mirror 18, but less than the width of the capping plate. The main section of the baffle 24 is tangent to the circumference of the lobes 48. An edge 50 of the baffle 24 which comes close to the reflex mirror 18 is set back from the portions of the lobes 48 which bear against the guide surface 46 and the underside of the capping plate 42. Further, the lobes 48 have a diameter greater than the thickness of the reflex mirror 18. This arrangement positively prevents contact between edge 50 and the surface of the reflex mirror 18 which might otherwise damage or scratch the reflecting surface of the reflex mirror 18. FIG. 4 best illustrates the arrangement described.

Figure 3:
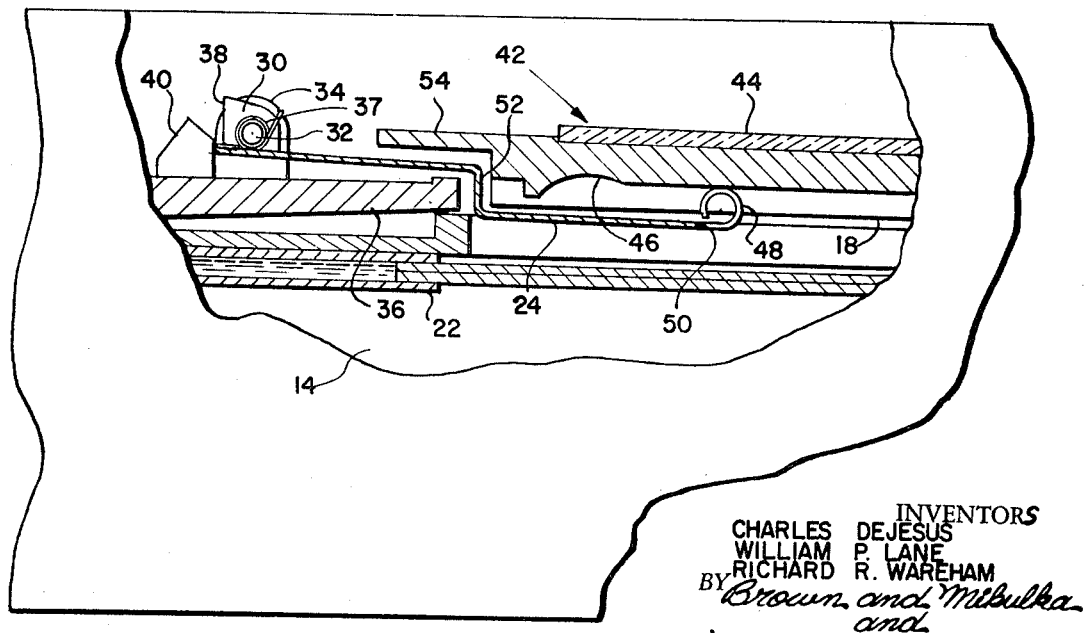
FIG. 3 illustrates a cross-section of a portion of the reflex camera of FIG. 1 with the baffle forming part of a labyrinth seal over a film cassette.

The capping plate 42 is shown at its lowermost point in FIG. 3. In this configuration, the baffle 24 is positioned between the section 36 and the underside of the capping plate 42. The baffle 24 extends the width of the opening in the cassette 14, and, being situate between the section 36 (functioning in this instance as a seal member) and a lip 54, attached to the capping plate 42, it forms a labyrinth light seal with them. The labyrinth seal prevents light from reaching and fogging the photosensitive surface of the uppermost film unit 22. The baffle 24 extends the width of the opening in the cassette 14, and it also extends from the axle 32 to the lobe 48. An offset 52 extending the width of the baffle 24 adds two turns to the shape of the labyrinth seal. Stray light which might enter the passage between the lip 54 and the baffle 24 will strike the surface of the baffle 24 as it proceeds into the labyrinth. But the light-absorbing finish on the surface of the baffle 24 will absorb the incident stray light attempting to traverse the passage preventing it from reaching the edge 50 and entering the cassette 14. Similarly, stray light attempting to traverse the passage, extending the width of the baffle 24, between the section 36 and the baffle 24 will also be trapped by the light-absorbing surface of the baffle 24 and prevented from entering the cassette 14. Contact seals rely on a precise mating of parts to exclude light whereas labyrinth seals rely, instead, on the general shape of their passage to exclude light eliminating a need for contact. Therefore, a desirable advantage obtained from using a labyrinth seal, as opposed to a contact type seal, is the avoidance of damage to the reflex mirror 18 by eliminating contact with a seal.

The offset 52 increases the lateral stiffness of the baffle 24. This permits the use of thinner and lighter material in constructing the baffle 24. A lighter baffle can accelerate upward more rapidly when released from its lowermost position by the capping plate 42 at the initiation of a photographic exposure sequence. The more rapid acceleration allows it to reach the proper position, shown in FIG. 1, for preventing flare and fogging of the film unit 22 before the shutter 17 opens.

It can be readily seen that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner than otherwise specifically described herein.

What is claimed is:

1. An apparatus for use with a reflex camera of the type comprising an objective lens; a film plane disposed obliquely to an axis of said objective lens; means for releasably receiving a cassette so constructed as to urge a film unit into coincidence with said film plane; a capping plate, movable between a first position, for covering said film plane, and a second position for exposing said film unit;

and baffle means movable between first and second positions, said baffle means in said first position preventing flare due to light entering said reflex camera from points outside the field of said reflex camera, reaching said film plane when said capping plate is in said second position; said baffle means including:

an offset portion extending the width of said baffle means so as to form a labyrinth seal means with a portion of said capping plate when said capping plate is in said first position and said baffle means is in said second position.

2. The apparatus according to claim 1, wherein said baffle means comprises:

an axle;

a plate, including said offset portion, pivotally mounted so as to rotate about said axle at its lower edge;

support means for said axle situate between said film plane and said objective lens, below the axis of said objective lens;

spring means for rotating said plate upwards to function as a baffle when said capping plate rotates to said second position; and stop means for arresting the upward rotation of said plate at a predetermined position to prevent flare.

3. The apparatus described in claim 2, further comprising a light-absorbant coating on said plate.

4. A reflex camera comprising:
   an objective lens;
   a film plane disposed obliquely to an axis of said objective lens;
   means for receiving and releasably securing a cassette constructed to urge a photosensitive surface into coincidence with said film plane;
   a seal member adjacent an opening in said cassette;
   cover means, movable between a first position, for preventing light from reaching said film plane, and a second position for permitting light to reach said film plane;
   baffle means, movably mounted and engageable with said seal member for preventing light from reaching said film plane when said cover means is in said first position and for preventing light entering said reflex camera from a point outside the field of said reflex camera from reaching said film plane when said cover means is in said second position.

5. The reflex camera described in claim 4, wherein said baffle means is mounted to pivot about an axis proximate said film plane and includes at least one lobe disposed on said baffle means, opposite said axis, and said cover means includes a guide surface positioned to engage said lobe as said cover means moves from said second position to said first position and thereby urge said baffle means toward said seal member.

6. The reflex camera described in claim 5, further comprising:
   spring means for urging said baffle means from engagement with said seal member by pivoting said baffle means about said axis toward a blocking position where said baffle means will obstruct said light entering said reflex camera from said points outside the field of said reflex camera; and
   stop means, working in concert with said spring means, for holding said baffle means at said blocking position.

7. The reflex camera described in claim 6, further comprising:
   a mirror attached to the surface of said cover means closest to said film plane; wherein said guide surface is located at the edge of said mirror and said lobe extends from said baffle means so as to prevent said baffle means from contacting said mirror.

8. In a reflex camera having an objective lens, a film plane disposed obliquely to an axis of said objective lens, means for releasably receiving a cassette constructed to urge a film unit into coincidence with said film plane; a capping plate having a mirror attached to its lowerside and movable between a first position for covering said film plane and a second position from where said mirror reflects an image formed by said objective lens to said film plane; the improvement which comprises:
   a baffle plate having an offset section extending its width;
   support means, situate between said film plane and said objective lens, said baffle plate mounted in said support means so as to rotate, about an axis at its edge and transverse to the axis of said objective lens, from a seal position, between said capping plate and said cassette when said capping plate is in its first position, to a flare blocking position, when said capping plate is in its second position;
   spring means for urging said baffle plate from said seal position to said flare blocking position; and
   stop means for positioning said baffle plate at said flare blocking position.

9. The improvement described in claim 8, further comprising:
   at least one lobe, extending from said baffle plate at its movable end so as to slideably contact a guide member attached to the lower side of said capping plate at the side of said mirror, to prevent said baffle plate from contacting said mirror when said capping plate rotates from said second position to said first position;
   said guide member bears on said baffle plate forcing it to rotate from said flare blocking position to said sealing position when said capping rotates from said second position to said first position.

10. The improvement described in claim 9, wherein said baffle plate with its offset section fits together with said capping plate, when the latter is in said first position, to form a labyrinth seal.

11. The improvement described in claim 9, further comprising a light-absorbing coating on said baffle plate.

12. The improvement, for use in a reflex camera having an objective lens, a film plane disposed obliquely to an axis of said objective lens, means for releasably receiving a cassette constructed so as to urge a film unit into coincidence with said film plane, a capping plate having a mirror attached to its lower side and movable between a first position for covering said film plane and a second position from where said mirror reflects an image formed by said objective lens to said film plane, comprising:
   a baffle plate movable between first and second positions, said baffle plate in said first position preventing flare on said film unit, said baffle plate having an offset section extending its width for forming a labyrinth seal in conjunction with a portion of said capping plate when said capping plate is in said first position and said baffle plate is in said second position; and
   bumper means for protecting said mirror from being scratched and otherwise damaged by said baffle plate.

13. The improvement described in claim 12 wherein said width is not less than the width of a photosensitive area on said film unit and said improvement further comprises:
   support means, situate between said film plane and said objective lens, said baffle plate mounted in said support means so as to rotate, about an axis at its edge and transverse to the axis of said objective lens, from a seal position, between said capping plate and said cassette when said capping plate is in its first position, to a flare blocking position, when said capping plate is in its second position;
   spring means for urging said baffle plate from said seal position to said flare blocking position; and
   stop means for positioning said baffle plate at said flare blocking position.

14. The improvement described in claim 13 wherein said bumper means comprise:

at least one lobe, extending from said baffle plate at its movable end so as to slideably contact a guide member attached to the lower side of said capping plate at the side of said mirror, to prevent said baffle plate from contacting said mirror when said capping plate rotates from said second position to said first position;

said guide member bears on said baffle plate forcing it to rotate from said flare blocking position to said sealing position when said capping rotates from said second position to said first position.

15. An apparatus for use with a reflex camera of the type comprising an objective lens; a film plane disposed obliquely to the axis of said objective lens; means for releasably receiving a cassette so constructed as to urge a film unit into coincidence with said film plane; and a capping plate, movable about a pivot between a first position, for covering said film plane, and a second position for exposing siad film unit; including:

a baffle plate, cooperable with said capping plate, for forming a labyrinth seal to prevent light from reaching said film unit when said capping plate is in said first position, and for preventing flare due to light entering said reflex camera from points outside the field of said reflex camera, reaching said film plane when said capping plate is in said second position, said baffle plate pivotally mounted so as to rotate about an axis at its lower edge in support means situate between said film plane and said objective lens below the axis of said objective lens;

spring means for rotating said baffle plate upwards to function as a baffle when said capping plate rotates to said second position;

stop means for arresting the upward rotation of said baffle plate at a predetermined position to prevent flare;

guide means, attached to the underside of said capping plate at its end remote from said pivot, for controlling the movement of said baffle plate toward its lower position when said capping plate moves from said second position back to said first position; and at least one lobe, extending from said baffle plate at its movable end so as to engage said guide means, to prevent said baffle plate from contacting a reflex mirror attached to the underside of said capping plate.

16. In a reflex camera having an objective lens; a film plane obliquely disposed to an axis of said objective lens; means for receiving a film unit and positioning it in said film plane; a capping plate having a mirror attached to its lower side and movable between a first position covering said film plane and a second position where said mirror reflects an image formed by said objective lens to said film plane; the improvement which comprises:

baffle means, movable between primary and secondary positions, for preventing, in its primary position, light entering said reflex camera from points outside the field of said reflex camera from reaching said film plane when said capping plate is in said second position;

means on said capping plate for urging said baffle means to its secondary position when said capping plate moves from said second to said first position; and means for urging said baffle means to said primary position when said capping plates moves from said first position to said second position.

17. The improved reflex camera described in claim 16, further comprising:

first means, on said baffle means, and second means, on said capping plate, to preclude light rays from reaching a film unit, when said capping plate is in said first position and said baffle means is in said secondary position, by the interaction of said first means and said second means.

18. The improved reflex camera described in claim 17, wherein the interaction of said first means and said second means forms a labyrinth light seal.

19. The improved reflex camera described in claim 18, wherein said baffle means is movable about a pivot and said means for uring said baffle means to its secondary position includes:

guide means, attached to the underside of said capping plate at its movable end, for controlling the movement of said baffle means toward said secondary position when said capping plate moves from said second position to said first position; and at least one lobe, extending from said baffle means at its end remote from said pivot so as to engage said guide means, to prevent said baffle means from contacting said mirror attached to the lower side of said capping plate.

* * * * *